(12) United States Patent
Nagayasu

(10) Patent No.: US 9,162,535 B2
(45) Date of Patent: Oct. 20, 2015

(54) PNEUMATIC TIRE

(75) Inventor: Masaaki Nagayasu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1031 days.

(21) Appl. No.: 13/247,900

(22) Filed: Sep. 28, 2011

(65) Prior Publication Data
US 2012/0180920 A1 Jul. 19, 2012

(30) Foreign Application Priority Data

Jan. 19, 2011 (JP) ................................. 2011-009249

(51) Int. Cl.
*B60C 11/12* (2006.01)
*B60C 11/13* (2006.01)
*B60C 11/03* (2006.01)

(52) U.S. Cl.
CPC ......... *B60C 11/1218* (2013.04); *B60C 11/0306* (2013.04); *B60C 2011/1213* (2013.04)

(58) Field of Classification Search
USPC ....................................... 152/209.21, 209.18
See application file for complete search history.

(56) References Cited

U.S. PATENT DOCUMENTS

| 7,143,799 | B2 | 12/2006 | Collette et al. | |
|---|---|---|---|---|
| 2006/0118221 | A1 | 6/2006 | Tsubono et al. | |
| 2009/0078351 | A1* | 3/2009 | Ebiko | 152/209.23 |
| 2009/0223613 | A1 | 9/2009 | Saeki | |
| 2010/0307651 | A1* | 12/2010 | Castellini | 152/209.21 |

FOREIGN PATENT DOCUMENTS

| CN | 1618636 | 5/2005 | |
|---|---|---|---|
| EP | 1170153 | 1/2002 | |
| EP | 2 039 535 A1 | 3/2009 | |
| JP | H10-052824 | 2/1998 | |
| JP | H10-080923 | 3/1998 | |
| JP | 2002-301910 | 10/2002 | |
| JP | 2002-316517 | 10/2002 | |
| JP | 2004-262285 | 9/2004 | |
| JP | 2005-126055 | 5/2005 | |
| JP | 2006-082632 | 3/2006 | |
| JP | 2007-137110 | * | 6/2007 |
| JP | 2010-0260416 | 11/2010 | |

(Continued)

OTHER PUBLICATIONS

JP 2007-137110, Jun. 2007, English language machine translation [http://translationportal.epo.org/emtp/translate/?ACTION=description-retrieval&COUNTRY=JP&ENGINE=google&FORMAT=docdb&KIND=A&LOCALE=en_EP&NUMBER=2007137110&OPS=jp. espacenet.com/ops&SRCLANG=ja&TRGLANG=en].*

(Continued)

*Primary Examiner* — Eric Hug
(74) *Attorney, Agent, or Firm* — Thorp North & Western

(57) ABSTRACT

A pneumatic tire includes sipes extending in a tire width direction on a road contact surface of blocks, the sipes having at least one end open to a circumferential main groove. The sipes are positioned at an edge portion of the blocks, and have a first sipe portion open to the circumferential main groove and a second sipe portion positioned at a center portion of the blocks. The first sipe portion has a linear form when viewed as a cross-section from a direction perpendicular to a sipe length direction, and has a pair of mutually mating, opposing first sipe wall faces with a protrusion and a recess respectively disposed thereon. The second sipe portion has a form bent in the sipe width direction when viewed as a cross-section from a direction perpendicular to the sipe length direction, and has a pair of mating mutually opposing second sipe wall faces.

23 Claims, 11 Drawing Sheets

(56) References Cited

FOREIGN PATENT DOCUMENTS

| RU | 2388620 | | 5/2010 |
|----|---------|---|--------|
| WO | WO 99/048707 | | 9/1999 |
| WO | WO 99/48707 | * | 9/1999 |
| WO | WO 2006/013694 | | 2/2006 |
| WO | WO 2008/010778 | | 1/2008 |
| WO | WO 2008/065947 | | 6/2008 |

OTHER PUBLICATIONS

Russian Notice of Allowance mailed Oct. 9, 2012.
Chinese Office Action dated Jan. 10, 2014, 22 pages, China.

* cited by examiner

CROSS-SECTIONAL VIEW ALONG IV-IV

CROSS-SECTIONAL VIEW ALONG VI

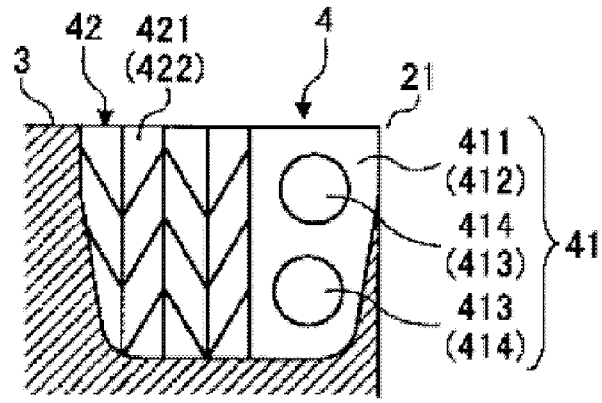

CROSS-SECTIONAL VIEW ALONG VII

FIG. 19

| | Conventional Example | Comparative Example 1 | Comparative Example 2 | Working Example 1 | Working Example 2 | Working Example 3 | Working Example 4 |
|---|---|---|---|---|---|---|---|
| Sipe end form | Three-dimensional | Planar | Planar + sipe bottom raised | Planar + protrusion and recess | Planar + protrusion and recess | Planar + protrusion and recess | Planar + protrusion and recess |
| Sipe center portion form | Three-dimensional | Three-dimensional | Three-dimensional | Three-dimensional | Three-dimensional | Three-dimensional | Three-dimensional |
| Protrusion height H (mm) | - | - | - | 2 | 1 | 5 | 2 |
| Sipe end length L | 0 | 3 | 3 | 3 | 3 | 3 | 3 |
| Protrusion orientation | - | - | - | Same | Same | Same | Varied |
| Braking performance on ice (when new) | 100 | 90 | 105 | 110 | 105 | 105 | 115 |
| Braking performance on ice (at 50% wear) | 100 | 110 | 90 | 110 | 110 | 110 | 110 |

FIG. 20

COMPARATIVE EXAMPLE 1

COMPARATIVE EXAMPLE 2

PNEUMATIC TIRE

PRIORITY CLAIM

Priority is claimed to Japan Patent Application Serial No. 2011-009249 filed on Jan. 19, 2011.

BACKGROUND

1. Technical Field

The present technology relates to a pneumatic tire, and particularly relates to a pneumatic tire whereby ease of manufacture can be enhanced while maintaining braking performance on ice.

2. Related Art

Pneumatic tires such as studless tires and the like have block patterns wherein a plurality of sipes is disposed for the purpose of enhancing braking performance on ice. While increasing the number of sipes leads to an increase in edge components of the sipes, it also leads to a decrease in block rigidity. Generally, block rigidity must be properly ensured because it affects braking performance on ice.

Conventional pneumatic tires that address this need are described in Japanese Patent No. 3894743 and Japanese Patent No. 4316452. Sipes of conventional pneumatic tires include what are known as "three-dimensional sipes", and, when viewed as a cross-section from a direction perpendicular to a sipe length direction, a wall face thereof has a form that is bent in a tire circumferential direction (sipe width direction).

However, with conventional pneumatic tires, it is necessary to provide an edge of a sipe molding die with a three-dimensional form in order to form the three-dimensional sipes. Producing a siping blade that provides the edge form described above is not generally easy. Therefore, there is a demand to simplify siping blade production and enhance the ease of manufacture of the tire.

SUMMARY

The present technology provides a pneumatic tire whereby ease of manufacture can be enhanced while maintaining braking performance on ice.

A pneumatic tire according to an embodiment of the present technology includes a plurality of circumferential main grooves extending in a tire circumferential direction, a plurality of lug grooves extending in a tire width direction, and blocks partitioned by the plurality of circumferential main grooves and the plurality of lug grooves. The blocks include sipes that extend in the tire width direction on a road contact surface of the blocks, and that have at least one end that is open to the circumferential main grooves. The sipes are positioned at an edge portion of the blocks, and have a first sipe portion that is open to the circumferential main grooves and a second sipe portion that is positioned at a center portion of the blocks. The first sipe portion has a linear form when viewed as a cross-section from a direction perpendicular to a sipe length direction, and has a pair of mutually opposing first sipe wall faces, and a protrusion and a recess that mutually mate and that are disposed, respectively, on the first sipe wall faces. The second sipe portion has a form bent in a sipe width direction when viewed as a cross-section from a direction perpendicular to the sipe length direction, and has a pair of mutually opposing second sipe wall faces that mate.

Additionally, with the pneumatic tire according to the present technology, a height H of the protrusion of the first sipe portion is preferably in a range of 0.5 mm≤H≤3 mm.

Moreover, with the pneumatic tire according to the present technology, a length L of the first sipe portion in the tire width direction is preferably in a range of 1 mm≤L≤5 mm.

Furthermore, with the pneumatic tire according to the present technology, the first sipe wall faces preferably have a linear form when a tread portion is viewed planarly.

Additionally, with the pneumatic tire according to the present technology, each wall face of the pair of opposing first sipe wall faces preferably includes at least one of the protrusions.

With the pneumatic tire of the present technology, the first sipe portion located at the sipe end has a structure based on the first sipe wall faces having a bi-dimensional form, a portion of which have protrusions and recesses disposed therein. Therefore, compared to a structure wherein an entirety of the sipe has a three-dimensional form, an edge form of a sipe molding die can be simplified. This is advantageous because the ease of manufacture of the tire is enhanced. Additionally, because the first sipe portion located at the sipe end has protrusions and recesses, rigidity of the sipe is increased due to the mating of the protrusions and recesses compared to a structure having a bi-dimensional form without the protrusions and recesses at the sipe end. This is advantageous because block rigidity is ensured and braking performance on ice of the tire is maintained.

BRIEF DESCRIPTION OF THE DRAWINGS

FIG. 19 is an explanatory view of a modified example of the sipe depicted in FIG. 4.

FIG. 20 is a table showing the results of performance testing of pneumatic tires according to examples of the present technology.

DETAILED DESCRIPTION

Pneumatic Tire

Figure 1:
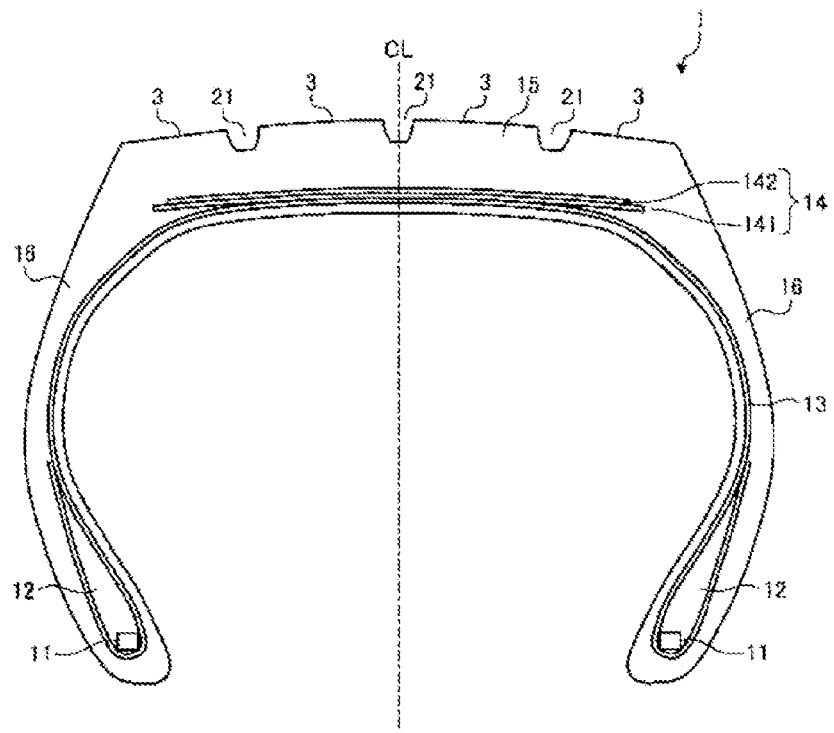
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. A tire for a passenger car is illustrated in this drawing.

A pneumatic tire 1 includes bead cores 11, bead fillers 12, a carcass layer 13, a belt layer 14, tread rubber 15, and side wall rubber 16 (see FIG. 1). The bead cores 11 have a ring structure, and a pair thereof is provided on left and right sides. The bead fillers 12 are disposed on a periphery of the bead cores 11 in a tire radial direction and reinforce bead portions of the tire. The carcass layer 13 stretches between the left and right side bead cores 11, in toroidal form, forming a framework for the tire. Additionally, both ends of the carcass layer 13 are folded toward an outer side in a tire width direction so as to envelop the bead fillers 12, and fixed. The belt layer 14 is formed from a plurality of laminated belt materials 141 and 142, and is disposed on a periphery of the carcass layer 13 in the tire radial direction. The tread rubber 15 is disposed on the periphery of the carcass layer 13 and the belt layer 14 in the tire radial direction, and forms a tire tread. The side wall rubber 16 is formed from a pair of left and right sides, is disposed on an outer side of the carcass layer 13 in the tire width direction, and forms sidewall portions of the tire.

Structure of the Sipes of the Blocks

Figure 2:
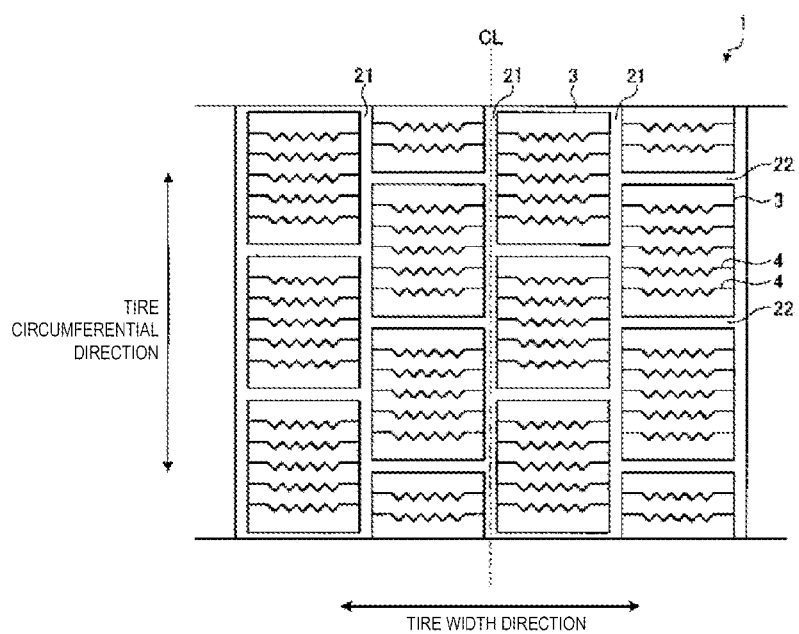
FIG. 2 is a plan view illustrating a tread portion of the pneumatic tire depicted in FIG. 1.
Figure 3:
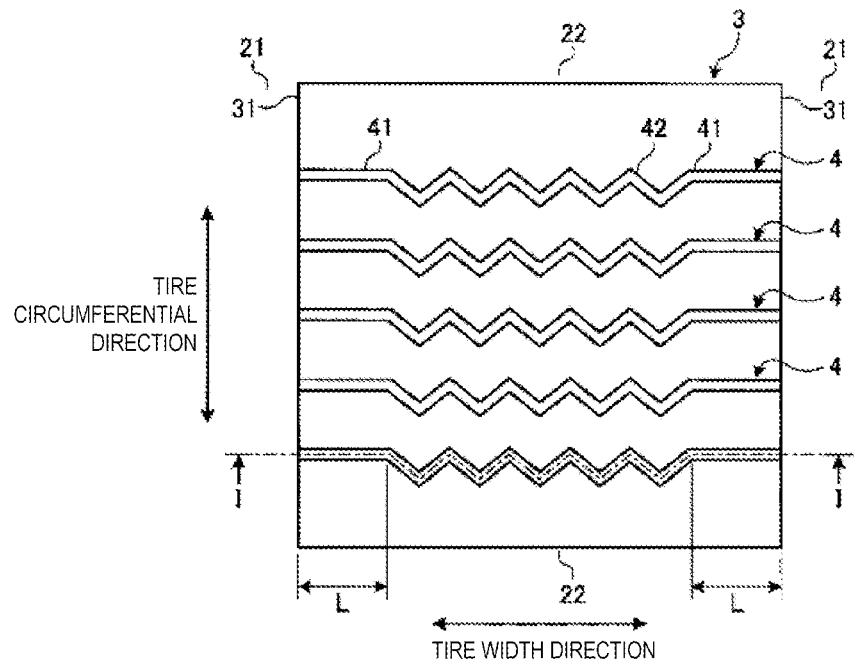
FIG. 3 is a plan view illustrating a block of the pneumatic tire depicted in FIG. 2.
Figure 4:
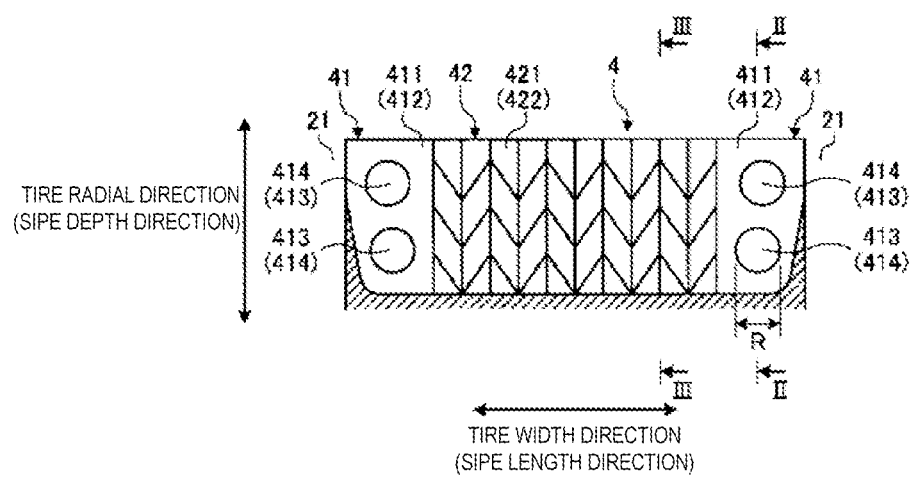
FIG. 4 is a cross-sectional view taken along line I-I illustrating a sipe of the block depicted in FIG. 3.
Figure 5:
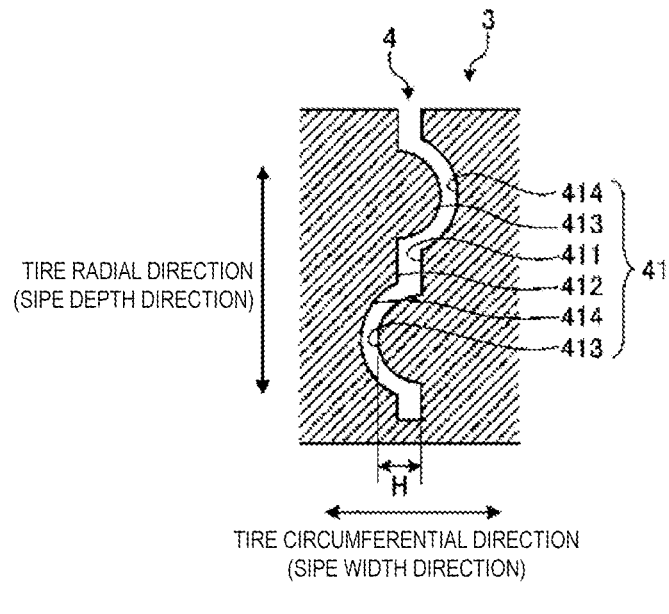
FIG. 5 is a cross-sectional view taken along line II-II illustrating the sipe depicted in FIG. 4.
Figure 6:
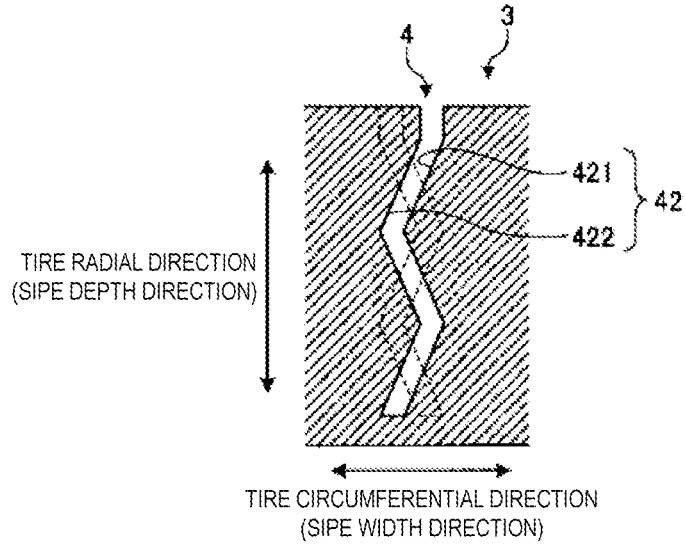
FIG. 6 is a cross-sectional view taken along line III-III illustrating the sipe depicted in FIG. 4.
Figure 7:
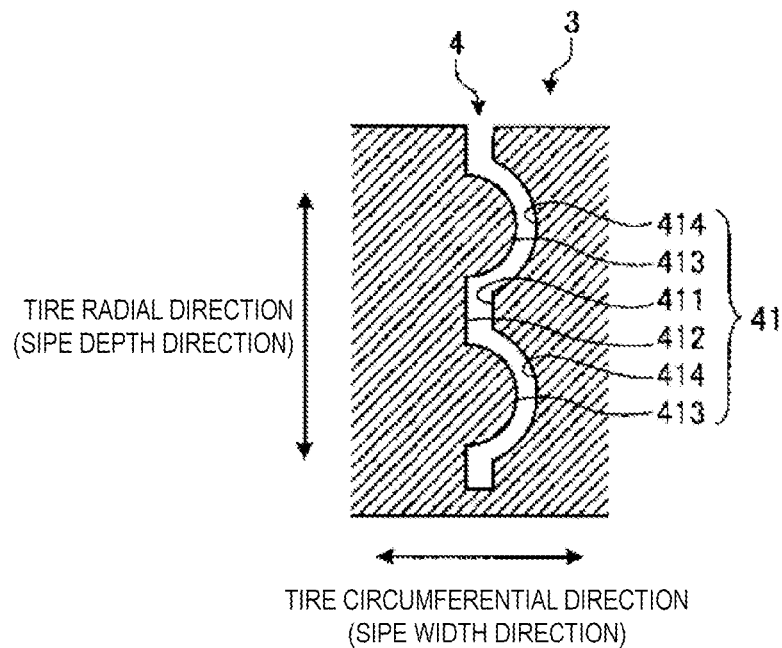
FIG. 7 is an explanatory view of a modified example of the sipe depicted in FIG. 4.
Figure 8:
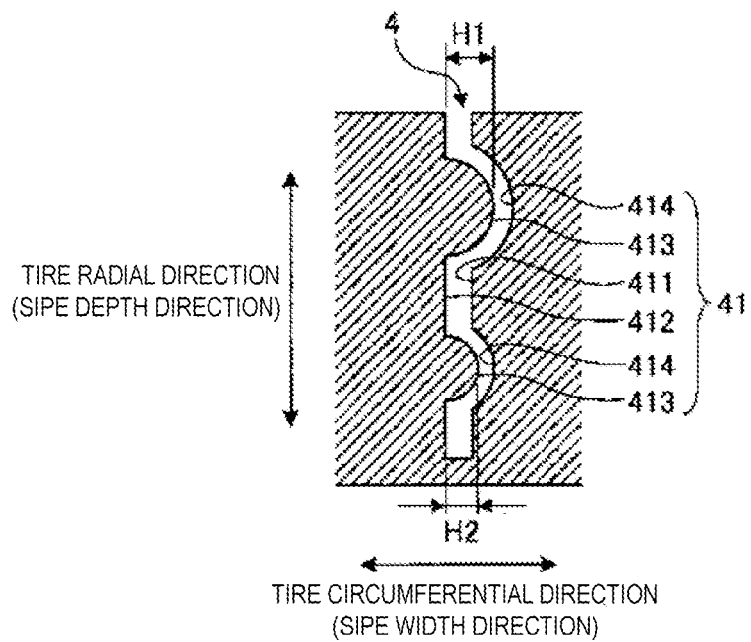
FIG. 8 is an explanatory view of a modified example of the sipe depicted in FIG. 4.
Figure 9:
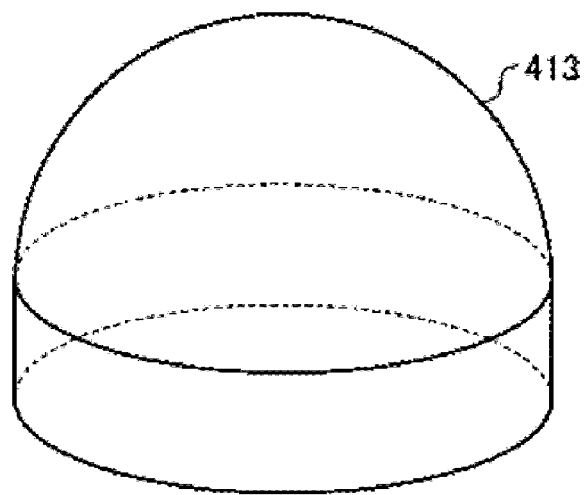
FIG. 9 is an explanatory view of a modified example of the sipe depicted in FIG. 4.
Figure 10:
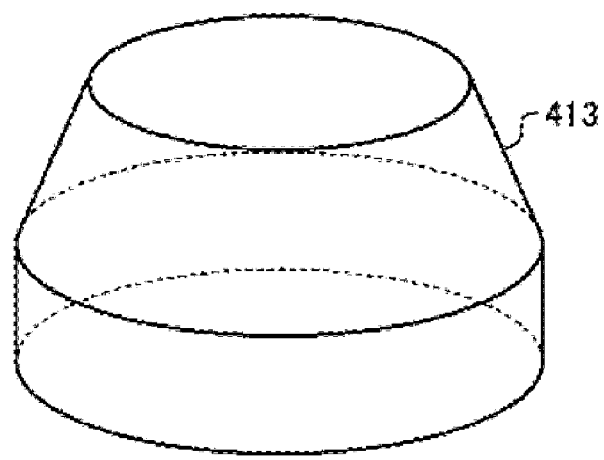
FIG. 10 is an explanatory view of a modified example of the sipe depicted in FIG. 4.
Figure 11:
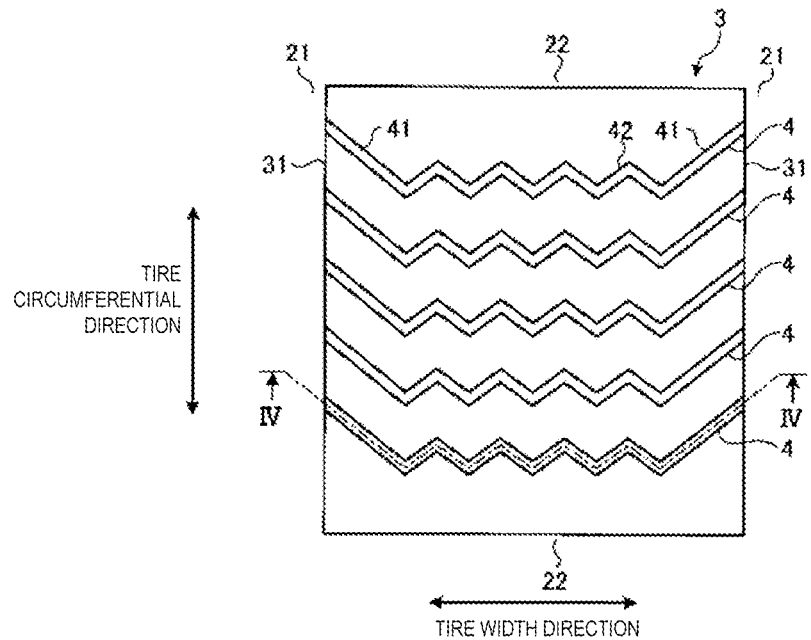
FIG. 11 is an explanatory view of a modified example of the sipe depicted in FIG. 4.
Figure 12:
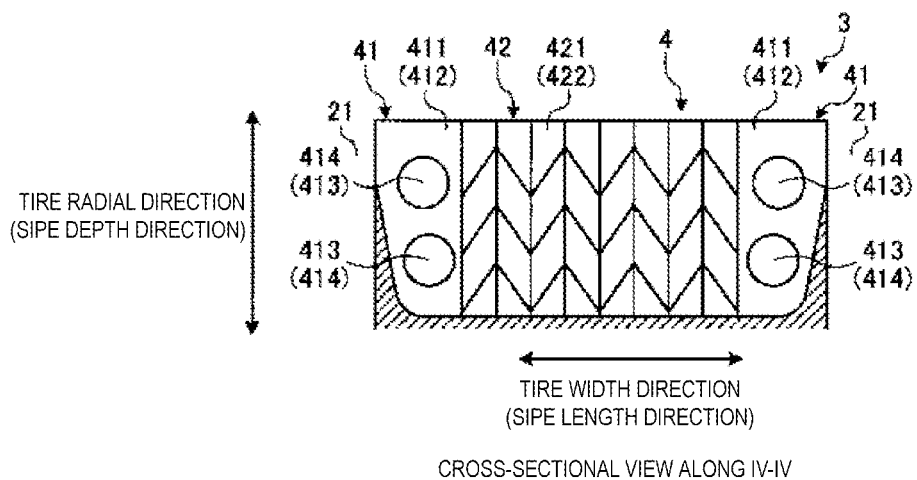
FIG. 12 is an explanatory view of a modified example of the sipe depicted in FIG. 4.
Figure 13:
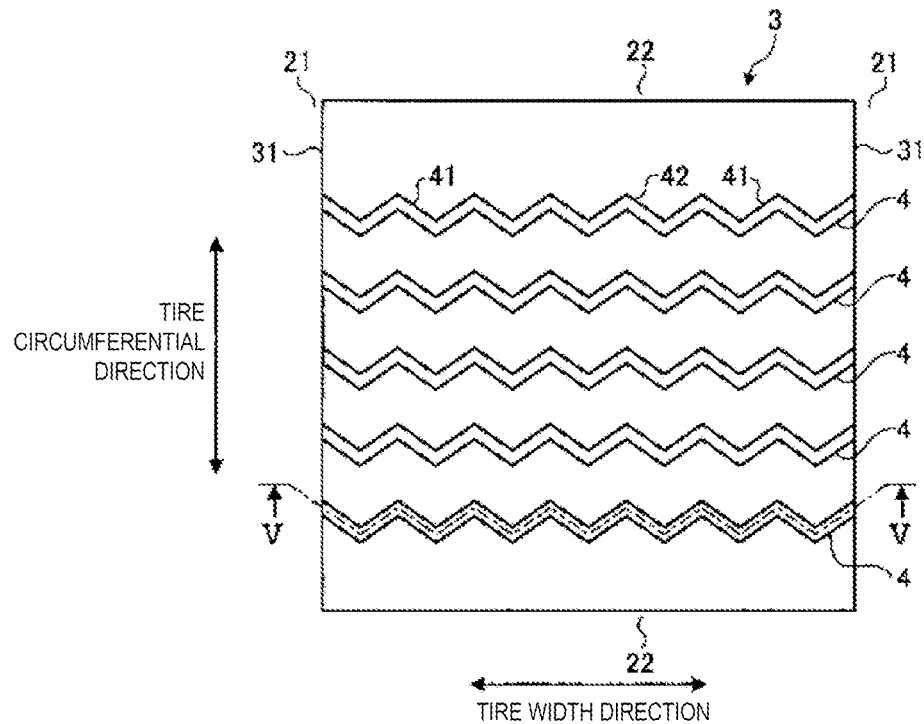
FIG. 13 is an explanatory view of a modified example of the sipe depicted in FIG. 4.
Figure 14:
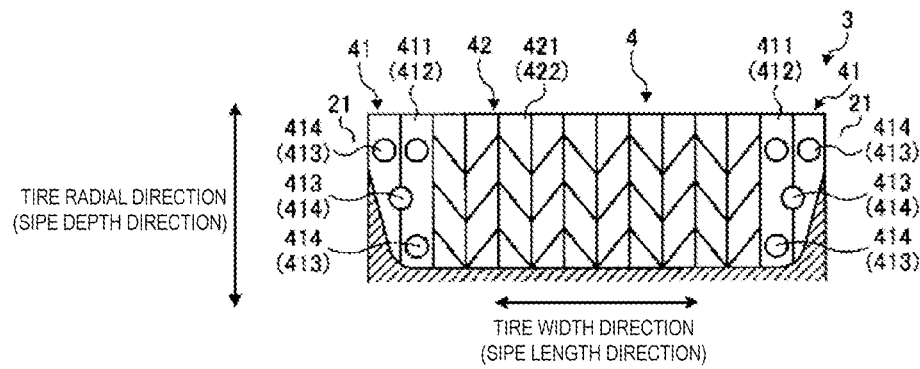
FIG. 14 is an explanatory view of a modified example of the sipe depicted in FIG. 4.

FIG. 2 is a plan view illustrating a tread portion of the pneumatic tire depicted in FIG. 1. FIG. 3 is a plan view illustrating a block of the pneumatic tire depicted in FIG. 2. FIG. 4 is a cross-sectional view taken along line I-I illustrating a sipe of the block depicted in FIG. 3. FIGS. 5 and 6 are cross-sectional views taken along line II-II (FIG. 5) and line III-III (FIG. 6) illustrating the sipe of the block depicted in FIG. 4. In FIGS. 4 to 6, FIG. 4 is a drawing depicting a sipe wall face of the block when viewed planarly; FIG. 5 is a drawing depicting the sipe wall face at an edge portion of the block; and FIG. 6 is a drawing depicting the sipe wall face at a center portion of the block.

The pneumatic tire 1 has a plurality of circumferential main grooves 21 extending in a tire circumferential direction, a plurality of lug grooves 22 extending in the tire width direction, and a plurality of blocks 3 partitioned by the circumferential main grooves 21 and the lug grooves 22 in the tread portion (see FIG. 2). For example, in this embodiment, four rows of the blocks 3 are formed by three of the circumferential main grooves 21 and a plurality of the lug grooves 22. Thereby, a block row-based tread pattern is formed.

The blocks 3 have a plurality of sipes 4 in a road contact surface thereof (see FIGS. 2 and 3). These sipes 4 are open sipes or semi-closed sipes, extend in the tire width direction, and have at least one end open to a circumferential main groove 21. Here, a portion of the structure of the sipes 4 that is positioned at an edge portion 31 of the circumferential main groove 21 of the blocks 3 and is open to the circumferential main groove 21 is referred to as a "first sipe portion 41", and a portion that is positioned at a center portion of the blocks 3 and is continuous with the first sipe portion 41 is referred to as a "second sipe portion 42".

For example, in this embodiment, the sipes 4 are open sipes, extend in the tire width direction on the road contact surface of the blocks 3 so as to cross the blocks 3, and open from the edge portions 31 and 31 of the left and right sides of the blocks 3 to each of the circumferential main grooves 21 and 21. Thus, one of the sipes 4 has the first sipe portion 41 at each end thereof, and a second sipe portion 42 in a center portion thereof. Additionally, the first sipe portions 41 and 41 on the left and right sides and the second sipe portion 42 are continuous. Additionally, one of the blocks 3 has five of the sipes 4, and the sipes 4 are arranged so as to be mutually parallel and to have a predetermined spacing in the tire circumferential direction.

The first sipe portion 41 has a pair of first sipe wall faces 411 and 412, a protrusion 413, and a recess 414 (see FIG. 5). The pair of first sipe wall faces 411 and 412 has a linear form when viewed as a cross-section from a direction perpendicular to a sipe length direction, and these are disposed so as to be mutually opposing. Such a form of the sipe wall faces that is unbent with respect to a sipe depth direction when viewed as a cross-section from a direction perpendicular to the sipe length direction is referred to as a "bi-dimensional form", or a "planar form". The protrusion 413 and the recess 414 (hereinafter also referred to as the "protrusion and recess 413 and 414") are disposed, respectively, on the opposing first sipe wall faces 411 and 412 so as to mutually mate.

For example, in this embodiment, when the tread portion is viewed planarly, the first sipe portion 41 has a linear form extending in the tire width direction (see FIG. 3). Additionally, each of the first sipe portions 41 has a pair of the first sipe wall faces 411 and 412 and two sets of the protrusion and recess 413 and 414 (see FIG. 4). Moreover, when the sipe wall face is viewed planarly, the first sipe wall face 411 (412) has a planar form, and the recess 414 (protrusion 413) of the first set and the protrusion 413 (recess 414) of the second set are disposed so as to be in a line in the sipe depth direction on the first sipe wall face 411 (412). Thus, each of the protrusion and recess 413 and 414 are disposed on both a road contact surface side and a sipe bottom side of the blocks. Furthermore, when viewed as a cross-section from a direction perpendicular to the sipe length direction, the sipes 4 extend from the road contact surface of the blocks 3 in the tire radial direction (see FIG. 5). Additionally, the pair of first sipe wall faces 411 and 412 has a linear form, and extends perpendicular to the road contact surface of the blocks 3. Moreover, the protrusion 413 and the recess 414 are disposed on each of the first sipe wall faces 411 and 412. Here, the protrusion 413 is formed on a first face of the first sipe wall faces 411 and the recess 414 is formed at a position opposite the protrusion 413 in a second face of the first sipe wall faces 412. Additionally, as described above, two sets of the protrusion and recess 413 and 414 are disposed so as to be in line in the sipe depth direction.

The second sipe portion 42 has a pair of second sipe wall faces 421 and 422 (see FIG. 6). The second sipe wall faces 421 and 422 have a form that is bent in the sipe width direction when viewed as a cross-section from a direction perpendicular to the sipe length direction, and are mutually opposing so as to mate. Such a form of the sipe wall faces that is bent in the sipe width direction when viewed as a cross-section from a direction perpendicular to the sipe length direction is referred to as a "three-dimensional form".

For example, in this embodiment, when the tread portion is viewed planarly, the second sipe portion 42 has a zigzag form extending in the tire width direction while oscillating in the tire circumferential direction (see FIG. 3). Additionally, when viewed as a cross-section from a direction perpendicular to the sipe length direction, the pair of second sipe wall faces 421 and 422 has a zigzag form extending in the sipe depth direction (the tire radial direction) while oscillating in the sipe width direction (see FIG. 6). Moreover, the opposing second sipe wall faces 421 and 422 bend in the same direction and, as a result, have a mutually mating form. Furthermore, in the second sipe portion 42, an angle of inclination of the second sipe wall faces 421 and 422 varies along the sipe length direction and, as a result, a three-dimensional wall face form is formed (see FIGS. 4 and 6).

In the pneumatic tire 1, the blocks 3 have the sipes 4 and, as a result, the edge components of the blocks 3 are increased and braking performance on ice of the tire is enhanced. Additionally, when ground contact pressure acts on the blocks 3 when the tire is rotating, the sipes 4 close, and the protrusion and recess 413 and 414 of the first sipe portion 41 and the second sipe wall faces 421 and 422 of the second sipe portion 42 each mate (not illustrated). Thereby, collapsing of the blocks 3 is suppressed and, as a result, a decline in block rigidity caused by the forming of the sipes 4 is suppressed.

Conventional sipes are formed using a sipe molding die (not illustrated). Sipe wall faces with three-dimensional forms are formed using a sipe molding die that has a three-dimensional form. Here, in cases where the sipes have ends with three-dimensional forms, it is necessary to provide an edge of the sipe molding die with a three-dimensional form. However, producing an edge having such a form is not easy.

On this point, with the pneumatic tire 1, the wall face form of the first sipe portion 41 is simpler than the wall face form of the second sipe portion 42 (see FIGS. 4 and 5). Therefore, the edge form of the sipe molding die can be simplified. Specifically, the form of the edge of the sipe molding die for forming the first sipe portion 41 can be simplified in comparison to the form of the center portion for forming the second sipe portion 42. This is possible because the first sipe portion 41 has a structure wherein the first sipe wall faces 411 and 412 have a bi-dimensional form (the wall faces are planar), and the protrusion and recess 413 and 414 are disposed in only a portion thereof.

Note that, with the pneumatic tire 1 a length L of the first sipe portion 41 in the tire width direction is preferably in a range of 1 mm≤L≤5 mm (see FIG. 3). Thereby, production of the edge form of the sipe molding die is facilitated. Note that the range where the first sipe portion 41 is provided is defined by the length L.

Additionally, in the pneumatic tire 1, a diameter R of the protrusion 413 of the first sipe portion 41 is preferably in a range of 0.5 mm≤R≤4 mm (see FIG. 4). Additionally, in the pneumatic tire, a height H of the protrusion 413 of the first sipe portion 41 is preferably in a range of 0.5 mm≤H≤3 mm (see FIG. 5). Thereby, the protrusion and recess 413 and 414 will mate properly and, thus, braking performance on ice of the tire will be enhanced.

Additionally, in the pneumatic tire 1, a sipe area Sa of the first sipe portion 41 and a sum Sp of a disposal area of the protrusions 413 and 414 in said first sipe portion 41 preferably have a relationship 0.3≤Sp/Sa≤0.7 (see FIG. 4). Specifically, the protrusion 413 is not disposed throughout the entire face of the first sipe portion 41. Rather, the protrusion 413 is disposed partially while leaving the planar first sipe wall faces 411 (412). Thereby, the production of the edge form of the sipe molding die is facilitated while the functionality of the protrusion and recess 413 and 414 is maintained. Note that the density at which the protrusion 413 is disposed is defined by the ratio Sp/Sa.

Modified Examples of the First Sipe Portion

FIGS. 7 to 14 are explanatory views of modified examples of the sipe depicted in FIG. 4. These drawings illustrate modified examples of the first sipe portion of the sipe depicted in FIG. 4.

In a sipe 4 of FIG. 4, the first sipe portion 41 has two sets of the protrusion and recess 413 and 414. The protrusion and recess 413 and 414 are disposed so as to be in a line in the sipe depth direction on the first sipe wall faces 411 and 412 (see FIGS. 4 and 5). Here, one of each of the protrusion 413 and the recess 414 are disposed in the first face of the first sipe wall faces 411, and one of each of the recess 414 and the protrusion 413, respectively corresponding thereto, are disposed in the second face of the first sipe wall faces 412 (see FIG. 5). Specifically, at least one of the protrusion 413 is provided in each of the opposing pair of first sipe wall faces 411 and 412. Such a configuration is preferable because regardless of which side in the tire circumferential direction (the sipe width direction) of the blocks 3 collapsing acts on, a collapsing of the blocks 3 can be effectively suppressed due to the mating of the protrusion and recess 413 and 414.

However, the present technology is not limited to this configuration. Two of the protrusions 413 and 413 may be disposed in a first face of the first sipe wall faces 412 and two of the recesses 414 and 414 may be disposed in a second face of the first sipe wall faces 411 (see FIG. 7). In other words, only the protrusion 413 (or only the recess 414) may be disposed disproportionately in one of the faces of the first sipe wall faces 411.

Additionally, in the sipe 4 of FIG. 4, the height H of the protrusion 413 on the block road contact surface side and the height H of the protrusion 413 on the sipe bottom side are set so as to be the same (see FIG. 5). However, the present technology is not limited to such a configuration, and a height H1 of the protrusion 413 on the block road contact surface side may be set so as to be greater than a height H2 of the protrusion 413 on the sipe bottom side (H1>H2; see FIG. 8). With such a configuration, the mating force of the protrusion and recess 413 and 414 on the block road contact surface side will be great. Thereby, block rigidity of the road contact surface side, where collapsing is prone to occur, can be effectively reinforced.

Additionally, in the sipe 4 of FIG. 4, the protrusion 413 has a hemispherical form (see FIGS. 4 and 5). Furthermore, the recess 414 has a hemispherical form that matches the protrusion 413. However, the present technology is not limited to such a configuration, and the protrusion 413 may have a semi-elliptical form or a truncated conical form (not illustrated). Additionally, the protrusion 413 may have a form in which a top portion on a protruding side is a hemisphere, a semi-ellipsoid, or a truncated cone; and a bottom portion is a cylinder (see FIGS. 9 and 10).

Additionally, in the sipe 4 of FIG. 4, when the tread portion is viewed planarly, the first sipe portion 41 (the first sipe wall faces 411 and 412) has a linear form and extends in the tire width direction (see FIG. 3). However, the present technology is not limited thereto, and the first sipe portion 41 may extend inclined to the tire width direction (see FIGS. 11 and 12).

Additionally, in the sipe 4 of FIG. 4, when the tread portion is viewed planarly, the first sipe wall faces 411 and 412 have a planar form because the first sipe portion 41 has a linear form (see FIGS. 3 and 4). Such a configuration is preferable because production of the edge form of the sipe molding die is facilitated. However, the present technology is not limited thereto, and, when the tread portion is view planarly, the first sipe portion 41 may be provided with a bent form or a zigzag form, thus providing the first sipe wall faces 411 and 412 with a form wherein a plane thereof is folded, a crease thereof being the sipe depth direction (see FIGS. 13 and 14). However, when viewed as a cross-section from a direction perpendicular to the sipe length direction the first sipe wall faces 411 and 412 do not have a bent portion but instead have a linear form (a bi-dimensional sipe wall face). Note that in such a configuration, the protrusion 413 can be disposed in convex portions and concave portions in addition to the planar portions of the first sipe wall faces 411 and 412 (see FIG. 14).

Modified Examples of the Second Sipe Portion

Figure 15:
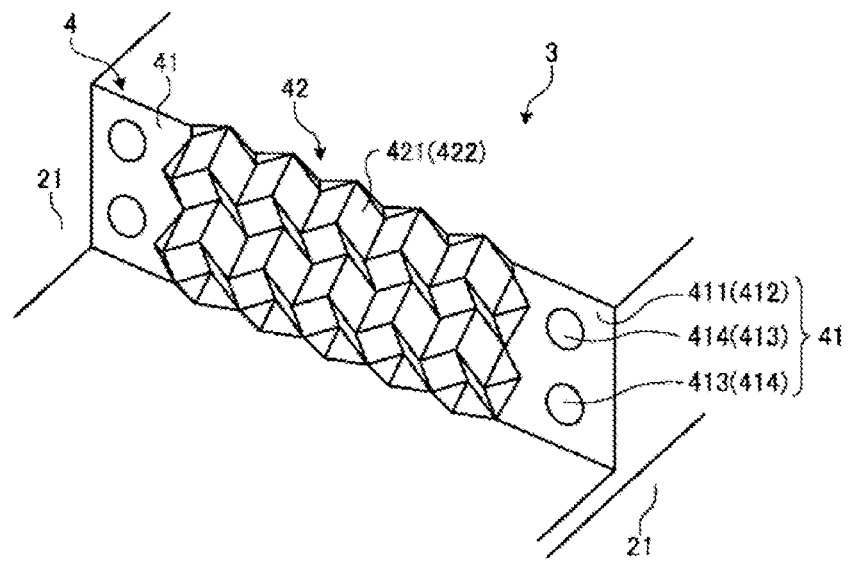
FIG. 15 is an explanatory view of a modified example of the sipe depicted in FIG. 4.
Figure 16:
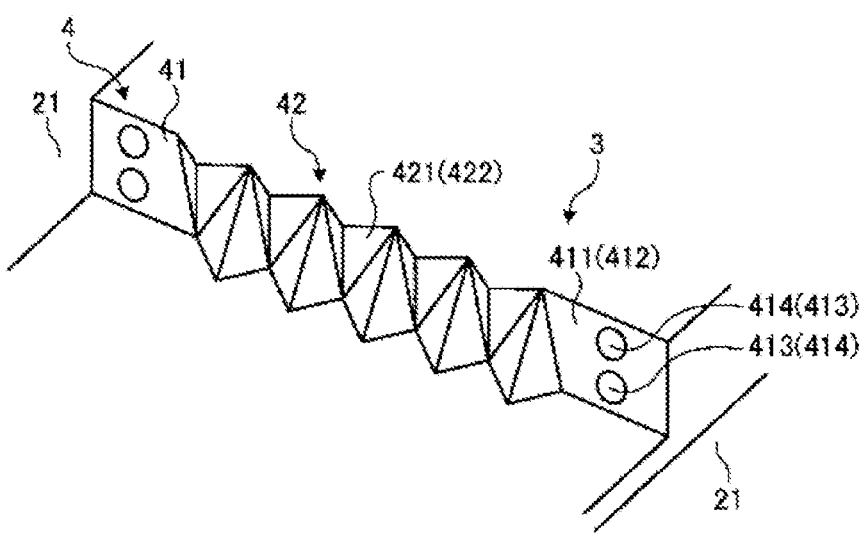
FIG. 16 is an explanatory view of a modified example of the sipe depicted in FIG. 4.

FIGS. 15 and 16 are explanatory views of modified examples of the sipe depicted in FIG. 4. These drawings illustrate modified examples of the second sipe portion of the sipe depicted in FIG. 4.

In the pneumatic tire 1, the second sipe portion 42 of the sipe 4 has second sipe wall faces 421 and 422 that have a three-dimensional form (a form bending in the sipe width direction when viewed as a cross-section from a direction perpendicular to the sipe length direction; see FIGS. 4 and 6). Thus, the second sipe portion 42 has a greater mating force between the opposing second sipe wall faces 421 and 422 than the first sipe portion 41 that has first sipe wall faces 411 and 412 with a bi-dimensional form (a linear form when viewed as a cross-section from a direction perpendicular to the sipe length direction) and wherein the protrusion and recess 413 and 414 are partially disposed.

Here, the pneumatic tire 1 is not limited to the configuration of FIG. 4, and the second sipe portion 42 may have the configurations described below (see FIGS. 15 and 16).

In the second sipe portion 42 of FIG. 15, the second sipe wall faces 421 and 422 have a structure in which pyramids and inverted pyramids are connected in the sipe length direction. In other words, the second sipe wall faces 421 and 422 is formed by mutually offsetting pitches of a zigzag form of the tread surface side and a zigzag form of the bottom side in the tire width direction so that mutually opposing protrusions and recesses are formed between the zigzag forms of the tread surface side and the bottom side. Additionally, with these protrusions and recesses, when viewed in a tire rotating direction, the second sipe wall faces 421 and 422 are formed by connecting a protrusion inflection point on the tread surface side to a recess inflection point on the bottom side, a recess inflection point on the tread surface side with a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, the first face of the second sipe wall faces 421 has a corrugated surface wherein convex pyramids and inverted pyramids thereof are arranged alternating in the tire width direction; and the second face of the second sipe wall faces 422 has a corrugated surface wherein concave pyramids and inverted pyramids thereof are arranged in the tire width direction. Furthermore, at least the corrugated surface disposed at outermost sides of both ends of the second sipe portion 42 (portions connecting with the first sipe portion 41) of the second sipe wall faces 421 and 422 are oriented toward an outer side of the blocks 3. Note that examples of such a second sipe portion 42 include the technology described in Japanese Patent No. 3894743.

Additionally, in the second sipe portion 42 of FIG. 16, the second sipe wall faces 421 and 422 have a structure in which a plurality of prism shapes having a block form are connected in the sipe depth direction and the sipe length direction while inclining with respect to the sipe depth direction. In other words, the second sipe wall faces 421 and 422 have a zigzag form in the tread surface. Additionally, the second sipe wall faces 421 and 422 have bent portions in at least two locations in the tire radial direction in the blocks 3 that bend in the tire circumferential direction and are connected in the tire width direction. Moreover, these bent portions have a zigzag form that oscillates in the tire radial direction. Additionally, while in the second sipe wall faces 421 and 422 the oscillation is constant in the tire circumferential direction, an inclination angle in the tire circumferential direction with respect to a normal line direction of the tread surface is configured so as to be smaller at a moiety on the sipe bottom side than at a moiety on the tread surface side; and the oscillation in the tire radial direction of the bent portion is configured so as to be greater at a moiety on the tread surface side than at a moiety on the sipe bottom side. Note that examples of such a second sipe portion 42 include the technology described in Japanese Patent No. 4316452.

Example of Application to Semi-Closed Sipes

Figure 17:
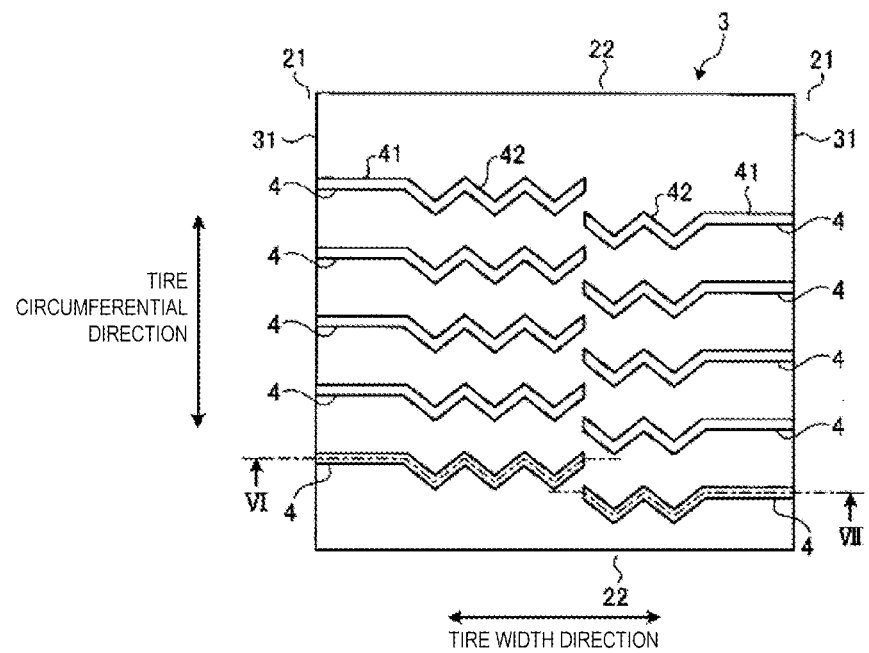
FIG. 17 is an explanatory view of a modified example of the sipe depicted in FIG. 4.
Figure 18:
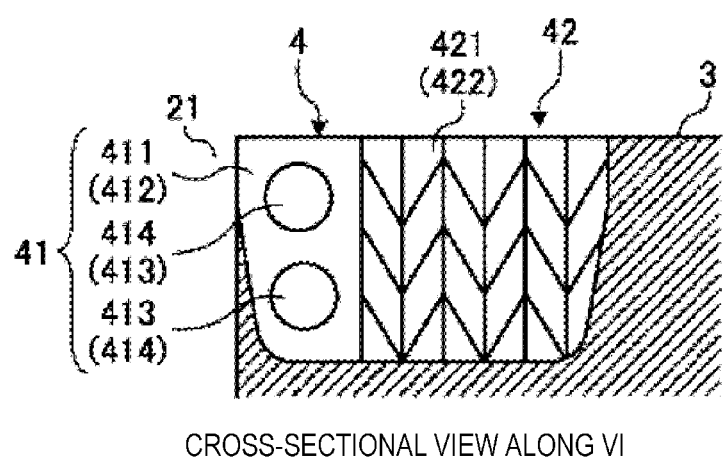
FIG. 18 is an explanatory view of a modified example of the sipe depicted in FIG. 4.

FIGS. 17 to 19 are explanatory views of modified examples of the sipe depicted in FIG. 4. These drawings illustrate cases where the sipe has a semi-closed structure.

The sipe 4 depicted in FIG. 4 has an open structure, crosses the blocks 3 in the tire width direction, and is open to left and right side circumferential main grooves 21 and 21. Additionally, the sipe 4 has a first sipe portion 41 in each of the right and left side ends, and is open to the circumferential main grooves 21 and 21 at each of these first sipe portions 41 and 41.

However, the present technology is not limited thereto, and the sipe 4 may have a semi-closed structure (see FIGS. 17 to 19). For example the sipe 4 of FIGS. 17 to 19 may be formed by connecting one first sipe portion 41 and one second sipe portion 42. Thus, a first end will be the first sipe portion 41 and a second end will be the second sipe portion 42. Additionally, the sipe 4 extends in the tire width direction on the block road contact surface, the end of the first sipe portion 41 side is open to the circumferential main groove 21, and the end of the second sipe portion 42 terminates in the center portion of the blocks 3. Thus, the sipe 4 may have the first sipe portion 41 only at the end of the side that is open to the circumferential main groove 21.

Effects

As described above, a pneumatic tire 1 includes sipes 4 extending in a tire width direction on a road contact surface of blocks 3, the sipes 4 having at least one end that is open to a circumferential main groove 21 (see FIG. 3). Moreover, the sipes 4 are positioned at an edge portion of the blocks 3, and have first sipe portions 41 that are open to the circumferential main grooves 21 and a second sipe portion 42 that is positioned at a center portion of the blocks 3 (see FIGS. 4 to 6). Additionally, the first sipe portions 41 have a linear form when viewed as a cross-section from a direction perpendicular to a sipe length direction, and have a pair of mutually opposing first sipe wall faces 411 and 412. Moreover, the first sipe portions 41 have a protrusion 413 and a recess 414 that mutually mate and that are disposed, respectively, on the first sipe wall faces 411 and 412. The second sipe portion 42 has a form bent in the sipe width direction when viewed as a cross-section from a direction perpendicular to the sipe length direction, and has a pair of mutually opposing second sipe wall faces 421 and 422 that mate.

In such a configuration, the first sipe portion 41 located at the sipe end has a structure wherein the first sipe wall faces 411 and 412 have a bi-dimensional form and the protrusion and recess 413 and 414 are disposed in a portion thereof (see FIGS. 4 to 6). Thus, compared to a structure wherein an entirety of the sipe has a three-dimensional form, the edge form of a sipe molding die can be simplified. This is advantageous because the ease of manufacture of the tire is enhanced.

Additionally, in such a configuration, because the first sipe portion 41 located at the sipe end has the protrusion and recess 413 and 414, rigidity of the sipe 4 is increased due to the mating of the protrusion and recess 413 and 414 compared to a structure having a bi-dimensional form without a protrusion and a recess at the sipe end. This is advantageous because block rigidity is ensured and braking performance on ice of the tire is maintained.

Additionally, in the pneumatic tire 1, a height H of the protrusion 413 of the first sipe portion 41 is preferably in a range of 0.5 mm≤H≤3 mm (see FIG. 5). This is advantageous because braking performance on ice of the tire is enhanced. It is not preferable that the height H is such that H<0.5 mm, because the protrusion and recess 413 and 414 will not mate and sufficient braking performance on ice will not be obtained. Likewise, it is not preferable that the height H is such that 3 mm<H because the space between the opposing first sipe wall faces 411 and 412 will increase excessively.

With the pneumatic tire 1 a length L of the first sipe portion 41 in the tire width direction is preferably in a range of 1 mm≤L≤5 mm (see FIG. 3). This is advantageous because production of the edge form of the sipe molding die is facilitated. It is not preferable that the length L is such that L<1 mm because it will be difficult to produce the edge form of the sipe molding die due to the second sipe portion 42 extending to the sipe end. Likewise, it is not preferable that the length L is such that 5 mm<L because the length of the second sipe portion 42 will be reduced and the mating action by the second sipe portion 42 will decline.

Furthermore, with the pneumatic tire 1, the first sipe wall faces 411 and 412 preferably have a linear form when the tread portion is viewed planarly (see FIG. 3). This is advantageous because production of the edge form of the sipe molding die is facilitated.

Additionally, with the pneumatic tire 1, each wall face of the pair of opposing first sipe wall faces 411 and 412 preferably includes at least one of the protrusions 413. With such a configuration the protrusion and recess 413 and 414 properly mate regardless of which side in the tire circumferential direction (the sipe width direction) the blocks 3 collapse. This is advantageous because braking performance on ice of the tire is properly maintained.

EXAMPLES

Performance Tests and Evaluations

Figure 21:
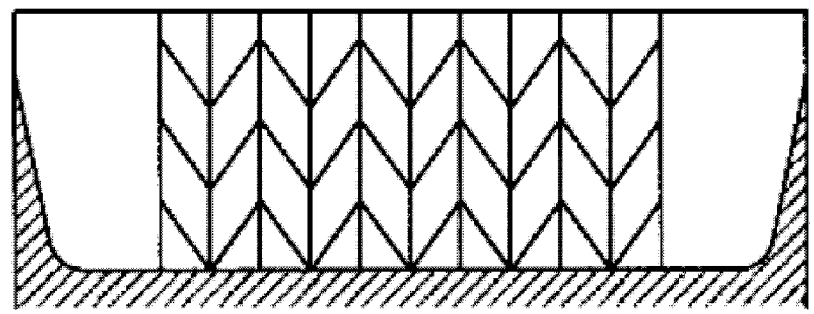
FIG. 21 is an explanatory view illustrating a pneumatic tire of Comparative Example 1.
Figure 22:
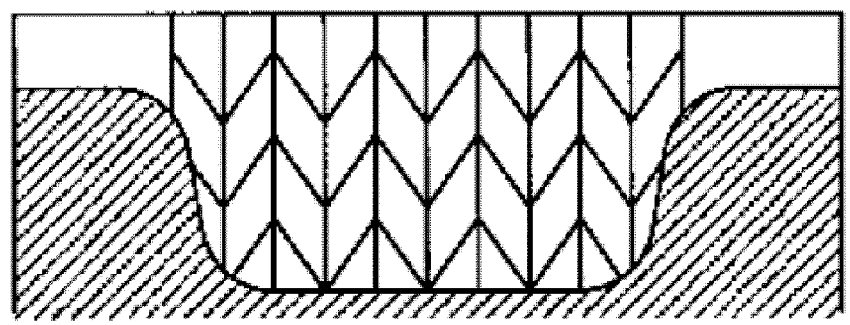
FIG. 22 is an explanatory view illustrating a pneumatic tire of Comparative Example 2.

FIG. 20 is a table showing the results of performance testing of pneumatic tires according to examples of the present technology. FIG. 21 is an explanatory view illustrating a pneumatic tire of Comparative Example 1. FIG. 22 is an explanatory view illustrating a pneumatic tire of Comparative Example 2.

In these examples, performance tests for braking performance on ice were performed for a plurality of pneumatic tires under different conditions (see FIG. 20).

For each of the braking performance on ice performance tests, pneumatic tires with a tire size of 195/65R15 were assembled on JATMA defined application rims; and a maximum air pressure and a maximum load defined by JATMA were applied to these pneumatic tires. Then, the pneumatic tires were mounted on a test vehicle and the test vehicle was driven on a frozen road surface. Evaluation was performed by measuring the braking distance from a traveling speed of 40 km/h. In this evaluation, the index value of the pneumatic tire of the Conventional Example was set as the standard score (100), and higher scores were preferable. Here, braking performance on ice was considered to be properly ensured when performance was evaluated to be 100 or higher.

The pneumatic tire 1 depicted in FIGS. 1 to 4, 6, and 7 was used in Working Examples 1 to 3; and the pneumatic tire 1 depicted in FIGS. 1 to 6 was used in Working Example 4. In Working Examples 1 to 4, the ends of the sipe 4 were constituted by a first sipe portion 41 formed by disposing the protrusion and recess 413 and 414 on the first sipe wall faces 411 and 412 having a planar form. Additionally, the center portion of the sipe 4 was constituted by a second sipe portion 42 having the second sipe wall faces 421 and 422 with three-dimensional forms.

The pneumatic tire of the Conventional Example had three-dimensional sipe wall faces throughout an entirety of the sipe (at the ends and the center portion). The pneumatic tire of Comparative Example 1 did not have the protrusions and recesses in the first sipe portion that the pneumatic tire 1 of Working Examples 1 had (see FIG. 21). The pneumatic tire of Comparative Example 2 was a pneumatic tire in which a bottom of the first sipe portion of the pneumatic tire 1 of Working Example 1 was raised (see FIG. 22).

As is clear from the test results, with the pneumatic tire 1 of Working Examples 1 to 4, the protrusion and recess 413 and 414 were disposed in the sipe end, thus leading to the braking performance on ice of the tires being properly ensured. Additionally, in a comparison of Working Examples 1 to 3, it is clear that the braking performance on ice of a tire is enhanced when the height H of the protrusion 413 is optimized. Moreover, it is clear that the braking performance on ice of a tire is enhanced more when the protrusion 413 is disposed on both of the first sipe wall faces 411 and 412 than when the protrusion 413 is disposed on only one wall face of the first sipe wall faces 411 (412).

As described above, the pneumatic tire according to the present technology is advantageous because ease of manufacture can be enhanced while braking performance on ice is ensured.

What is claimed is:

1. A pneumatic tire comprising:
a plurality of circumferential main grooves extending in a tire circumferential direction,
a plurality of lug grooves extending in a tire width direction, and
blocks partitioned by the plurality of circumferential main grooves and the plurality of lug grooves, wherein
the blocks include sipes that extend in the tire width direction on a road contact surface of the blocks, and that have at least one end that is open to the circumferential main grooves;
the sipes are positioned at an edge portion of the blocks, and have a first sipe portion that is open to the circumferential main grooves and a second sipe portion that is positioned at a center portion of the blocks;
the first sipe portion has a linear form when viewed as a cross-section from a direction perpendicular to a sipe length direction, and has a pair of mutually opposing first sipe wall faces, and a protrusion and a recess that mutually mate and that are disposed, respectively, on the first sipe wall faces;

a bottom of the first sipe portion is raised at the edge portion of a circumferential main groove side and in a circumferential main groove side of convex portions and concave portions of the first sipe portion; and the second sipe portion has a form bent in a sipe width direction when viewed as a cross-section from a direction perpendicular to the sipe length direction, and has a pair of mutually opposing second sipe wall faces that mate.

2. The pneumatic tire according to claim 1, wherein a height H of the protrusion of the first sipe portion is in a range of 0.5 mm≤H≤3 mm.

3. The pneumatic tire according to claim 1, wherein a length L of the first sipe portion in the tire width direction is in a range of 1 mm≤L≤5 mm.

4. The pneumatic tire according to claim 1, wherein the first sipe wall faces have a linear form when a tread portion is viewed planarly.

5. The pneumatic tire according to claim 1, wherein each wall face of the pair of opposing first sipe wall faces comprises at least one of the protrusions.

6. The pneumatic tire according to claim 1, wherein a diameter R of the protrusion of the first sipe portion is in a range of 0.5 mm≤R≤4 mm.

7. The pneumatic tire according to claim 1, wherein a sipe area Sa of the first sipe portion and a sum Sp of a disposal area of the protrusions in said first sipe portion have a relationship 0.3≤Sp/Sa≤0.7.

8. The pneumatic tire according to claim 1, wherein:
the first sipe wall faces are planar, and
the protrusion is not disposed throughout the entire face of the first sipe portion and is disposed partially while leaving the planar first sipe wall faces.

9. The pneumatic tire according to claim 1, wherein when a tread portion is viewed planarly, the first sipe portion has a linear form and the first sipe wall faces have a planar form.

10. The pneumatic tire according to claim 1, wherein when a tread portion is view planarly, the first sipe portion has a bent form or a zigzag form and the first sipe wall faces have a form wherein a plane thereof is folded, a crease of a fold thereof being a sipe depth direction.

11. The pneumatic tire according to claim 10, wherein when viewed as a cross-section from a direction perpendicular to the sipe length direction, the first sipe wall faces have a linear form.

12. The pneumatic tire according to claim 11, wherein the first sipe wall faces comprise planar portions, the convex portions, and the concave portions.

13. The pneumatic tire according to claim 1, wherein the protrusion is disposed in convex portions and concave portions in addition to the planar portions of the first sipe wall faces.

14. The pneumatic tire according to claim 1, wherein:
when a tread portion is viewed planarly, the second sipe portion has a zigzag form extending in the tire width direction while oscillating in the tire circumferential direction; and
when viewed as a cross-section from a direction perpendicular to the sipe length direction, the pair of second sipe wall faces has a zigzag form extending in a sipe depth direction while oscillating in the sipe width direction.

15. The pneumatic tire according to claim 14, wherein an angle of inclination of the second sipe wall faces varies along the sipe length direction.

16. The pneumatic tire according to claim 1, wherein:
the first sipe portion includes at least two sets of the protrusion and recess, the protrusion and recess being disposed in a line in a sipe depth direction on the first sipe wall faces, and
one of each of the protrusion and the recess are disposed in the first face of the first sipe wall faces and one of each of the recess and the protrusion, respectively corresponding thereto, are disposed in the second face of the first sipe wall faces.

17. The pneumatic tire according to claim 1, wherein:
the first sipe portion includes at least two sets of the protrusion and recess, and
the protrusions are disposed in a first face of the first sipe wall faces and the recesses are disposed in a second face of the first sipe wall faces.

18. The pneumatic tire according to claim 1, wherein:
the first sipe portion includes at least two sets of the protrusion and recess, and
a height H of the protrusion on a block road contact surface side and the height H of the protrusion on a sipe bottom side are set so as to be the same.

19. The pneumatic tire according to claim 1, wherein:
the first sipe portion includes at least two sets of the protrusion and recess, and
a height H1 of the protrusion on a block road contact surface side is set so as to be greater than a height H2 of the protrusion on a sipe bottom side (H1>H2).

20. The pneumatic tire according to claim 1, wherein the first sipe portion extends inclined to the tire width direction.

21. The pneumatic tire according to claim 1, wherein the protrusion has a form in which a top portion on a protruding side is a hemisphere, a semi-ellipsoid, or a truncated cone; and a bottom portion is a cylinder.

22. The pneumatic tire according to claim 1, wherein in a planar view of a tread portion, the first sipe portion has a bent form or a zigzag form and the first sipe wall faces have a form wherein a plane thereof is folded, a crease of a fold thereof being a sipe depth direction; and the protrusion is disposed in convex portions and concave portions in addition to planar portions of the first sipe wall faces respectively.

23. The pneumatic tire according to claim 1, wherein the pair of the second sipe wall faces has a structure in which a plurality of pyramids or prism are continuously connected in the sipe length direction.

\* \* \* \* \*